(12) United States Patent
Throop

(10) Patent No.: US 7,200,641 B1
(45) Date of Patent: Apr. 3, 2007

(54) METHOD AND SYSTEM FOR ENCODING SCSI REQUESTS FOR TRANSMISSION USING TCP/IP

(75) Inventor: Dean Throop, Chapel Hill, NC (US)

(73) Assignee: EMC Corporation, Hopkinton, MA (US)

(*) Notice: Subject to any disclaimer, the term of this patent is extended or adjusted under 35 U.S.C. 154(b) by 962 days.

(21) Appl. No.: 09/752,199

(22) Filed: Dec. 29, 2000

(51) Int. Cl.
*G06F 15/16* (2006.01)
*G06F 3/00* (2006.01)

(52) U.S. Cl. ............ 709/217; 709/218; 709/230; 709/250; 710/5; 710/8; 710/9; 710/36; 710/38

(58) Field of Classification Search ............ 710/5, 710/6, 8, 9, 36, 38, 3; 709/270, 250, 217, 709/218
See application file for complete search history.

(56) References Cited

U.S. PATENT DOCUMENTS

| | | | | |
|---|---|---|---|---|
| 5,996,024 A * | 11/1999 | Blumenau | ............ | 710/8 |
| 6,470,382 B1 * | 10/2002 | Wang et al. | ............ | 710/3 |
| 6,567,853 B2 * | 5/2003 | Shomler | ............ | 709/229 |
| 6,658,459 B1 * | 12/2003 | Kwan et al. | ............ | 710/5 |
| 6,697,895 B1 * | 2/2004 | Sherritt et al. | ............ | 710/5 |
| 6,738,821 B1 * | 5/2004 | Wilson et al. | ............ | 709/230 |
| 6,836,830 B1 * | 12/2004 | Yamagami et al. | ............ | 711/162 |
| 6,931,450 B2 * | 8/2005 | Howard et al. | ............ | 709/229 |

OTHER PUBLICATIONS

Harry Newton, Newton's Telecom Dictionary, 2003, CMP Books, 19th Edition, p. 712.*

* cited by examiner

*Primary Examiner*—Kim Huynh
*Assistant Examiner*—Joshua D. Schneider
(74) *Attorney, Agent, or Firm*—A. Jose Cortina; R. Kevin Perkins; Daniels Daniels & Verdonik, P.A.

(57) ABSTRACT

A system and method provides for establishing a direct TCP/IP connection between a workstation and a storage system independent of a server to which the storage system is connected. A SCSI request is encoded with tags identifying the request as a SCSI request, and the request is structured with a request IP identification. The tagged SCSI request is then sent to the storage system, and the request IP identification of the SCSI request is returned from the target device to the workstation to thereby allow exchange of SCSI requests over a TCP/IP connection directly between the workstation and the storage system, independent of involving the server.

25 Claims, 4 Drawing Sheets

METHOD AND SYSTEM FOR ENCODING SCSI REQUESTS FOR TRANSMISSION USING TCP/IP

BACKGROUND OF THE INVENTION

1. Field of the Invention

This invention relates to a method and system for encoding SCSI requests for transmission using TCP/IP with a computer system connected to one or more target devices. More specifically, the method and system provides for making SCSI requests over a TCP/IP connection directly to target devices. In addition, the method and system provides a direct connection from a workstation to a target device independent of a host system to which both the workstation and the target device is connected. This allows transmitting SCSI requests over TCP/IP directly from the workstation to the target device without involving the host system.

2. Description of the Prior Art

Present day arrangements of networks typically involve a host system, i.e., a server, having multiple target devices, i.e., storage systems, connected thereto by means of a fibre channel connection capable of transmitting and receiving SCSI requests during the normal operation of the host system, and with the various storage units implementing conventional input/output (I/O) operations. Such networks also typically include a workstation connected to the host system which allows specific requests and operations to be conducted from the workstation, with the host system and/or through the host system to the target devices, i.e., storage units.

In such systems, it is often the case that a user at the workstation occasionally desires to obtain information from the target devices beyond the normal operation of the network. Presently, this is done by providing an instruction to the host system, and through a program on the host system, the instruction is transmitted to the storage system. The storage system then replies to the request through the host.

A problem with such a system is that when the workstation accesses the storage system through the host system's Host Bus Adapters (HBAs), the host system will stop performing other requests while the workstation is using its fibre pass-through. More specifically, ordinarily in the operation of such a network there are a number of file system read and write requests. When a management request is transmitted through the host system from the workstation, those read and write requests are interrupted, and while the workstation is interacting through the host system with the storage system, there are no read and write requests occurring because the host system is programmed to avoid effecting such read and write requests as a means of not interfering with the workstation interaction with the target devices.

A problem with such an approach is that CPU cycles on the host system are being used for non-productive work in performing the set up and data transfers, and the host system is also locked out from all of the other transfers that normally occur to the target device, i.e., storage system. This occurs because the operating system running on the host system includes software that uses the SCSI controllers for doing industry standard block I/O. Because the operating system has exclusive use of the SCSI controllers, it is often difficult to write a user program that can send specific SCSI requests using the SCSI controllers.

Some operating systems provide a user pass-through capability that allows a user program to send specific SCSI requests from a workstation to a target device. These pass-through capabilities are operating-system specific and do not always work very well. In many cases the operating system SCSI pass-through request will also stop other traffic until the request is completed, degrading system performance.

In an alternative implementation, the workstation can be configured to access a target device directly by connection using a serial cable. The workstation program encodes specific SCSI requests and transmits them to the target device over the serial line. This is available for use with a wide variety of operating systems, but the encoding is error prone and somewhat slow.

In accordance with the method and system described herein, the problems of the existing systems and methods are avoided.

SUMMARY OF THE INVENTION

There is described herein a method of transmitting requests to a target device. The method provides for establishing a direct TCP/IP connection between a computer system and a target device. A SCSI request is encoded with a tag identifying the request as a SCSI request, and structuring the request with a request IP/ID. The tagged SCSI request is sent to the target device, and the target device returns the request IP/ID to the computer system.

In a more specific aspect, the encoding step includes structuring the field of the SCSI request in a manner substantially the same as a SCSI fibre request from a host system to a target device. The encoding step further includes providing a data buffer containing data to allow the target device to read the data buffer. Alternatively, if no data buffer is included in the encoding step, the target device returns a data buffer generated by the target device to the computer system.

In a yet more specific aspect, the target device is a storage system, and the computer system comprises a server connected to the storage system through SCSI cable and a workstation connected to the server with the workstation directly connected to the storage system for establishing the TCP/IP connection with the storage system. In this manner, the workstation can communicate SCSI requests over TCP/IP directly to the storage system without involving the host system.

Alternatively, there is described a system for directly transmitting requests to a target device connected to a computer system. The computer system is connectable directly through a TCP/IP connection to the target device. The computer system is configured for encoding a SCSI request with tags identifying the requests as a SCSI request, and for structuring the request with an IP/ID. An instruction module in the computer system serves to send the tagged SCSI request to the target device when the computer system is directly connected through a TCP/IP connection to the target device. The target device is programmed to accept the SCSI request when connected to the workstation directly, and for returning the request IP/ID of the SCSI request and a reply to the computer system when connected thereto.

In a more specific aspect of the system, the computer system is further configured for structuring the field of the SCSI request in a manner substantially the same as a SCSI fiber request from a host system to a target device. As part of the encoding, the computer system may create a data buffer containing data to allow the target device to read the data buffer. If no data buffer is created, the target device is configured for generating and returning a data buffer to the computer system in response to a request received from the workstation.

In a more specific aspect, in the system the target device is a storage system. The computer system comprises a server connected to the storage system through SCSI cable and a workstation connected to the server. The workstation is directly connected to the storage system for establishing the TCP/IP connection with the storage system.

BRIEF DESCRIPTION OF THE DRAWINGS

Having thus briefly described the invention, the same will become better understood from the following detailed discussion, made with reference to the appended drawings, in which.

DETAILED DISCUSSION

Figure 1:
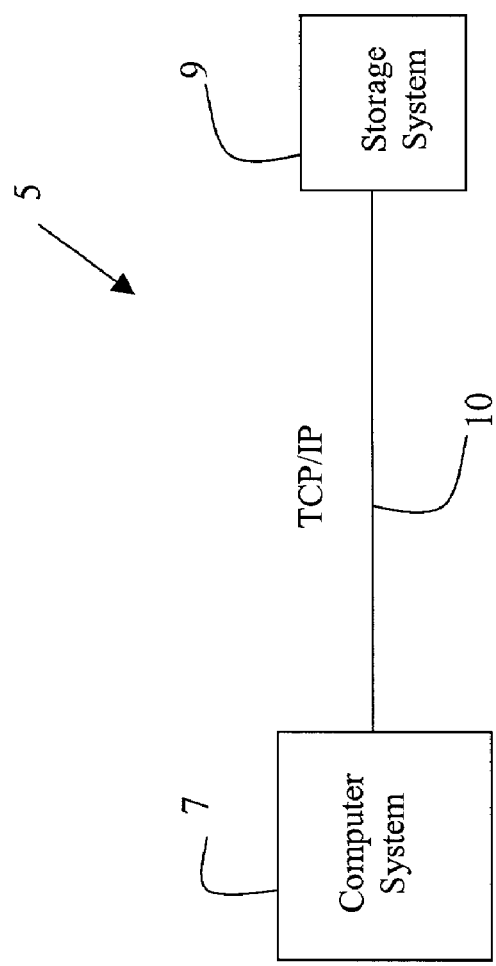
FIG. 1 is a schematic block diagram of a simple configuration for implementing the system and method described herein.

FIG. 1 illustrates a simple version of a system on which the invention might be implemented. The system 5 of FIG. 1 includes a computer system 7, which can be a workstation, a complex server and workstation system, personal computer or other like system as will be readily apparent to those of ordinary skill in the art, connected through a communications line 10 capable of supporting a TCP/IP communications protocol to a remote device 9 such as a storage system. Typically communications between computer systems such as computer system 7 and remote devices such as storage system 9 in the past have involved a communications connection which directly supports SCSI requests and transmissions. SCSI is a conventional and well-known protocol which has evolved over the years, and is implemented through different types of communications connections, including Fibre Channel as is well known to those of ordinary skill in the art, and even possibly wireless communications.

TCP/IP is a well-known alternative protocol which has been developed, in particular such as for use in networks such as the global computer network known as the Internet™. At times, conventional SCSI communications cables and lines are not available and it becomes desirable to use an alternative communications protocol such as TCP/IP to send requests to remote devices such as storage system 9. In accordance with one aspect of the system and method disclosed herein, SCSI requests can be transmitted over communications line 10 from the computer system 7 to the storage system 9 and back using a TCP/IP protocol.

Figure 2:
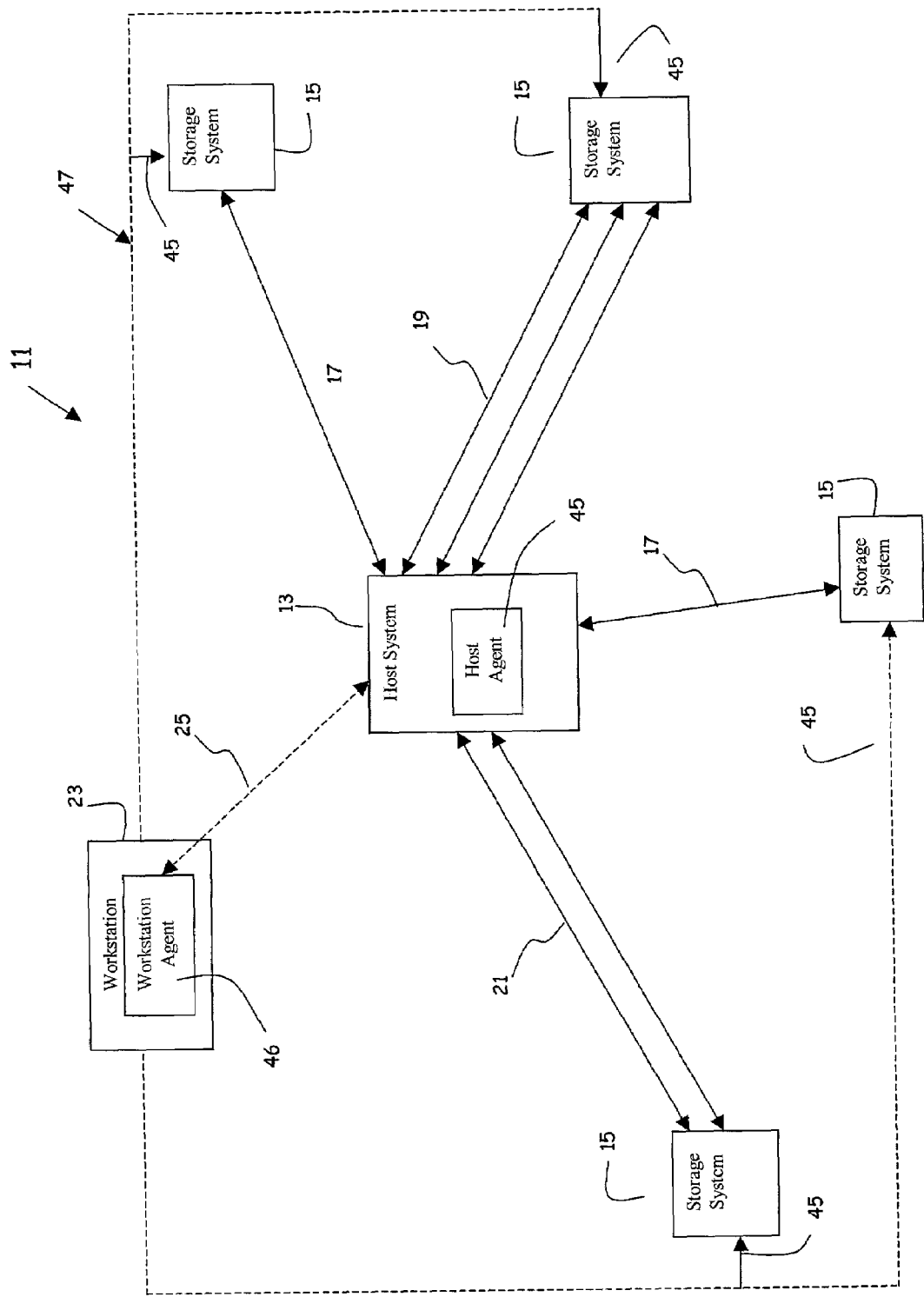
FIG. 2 is a schematic block diagram showing an alternative and more detailed system in which the system and method described herein are implemented, including a host system connected to multiple target devices, with a workstation connected to the host system, and also separately and independently connected to each of the target devices.
Figure 3:
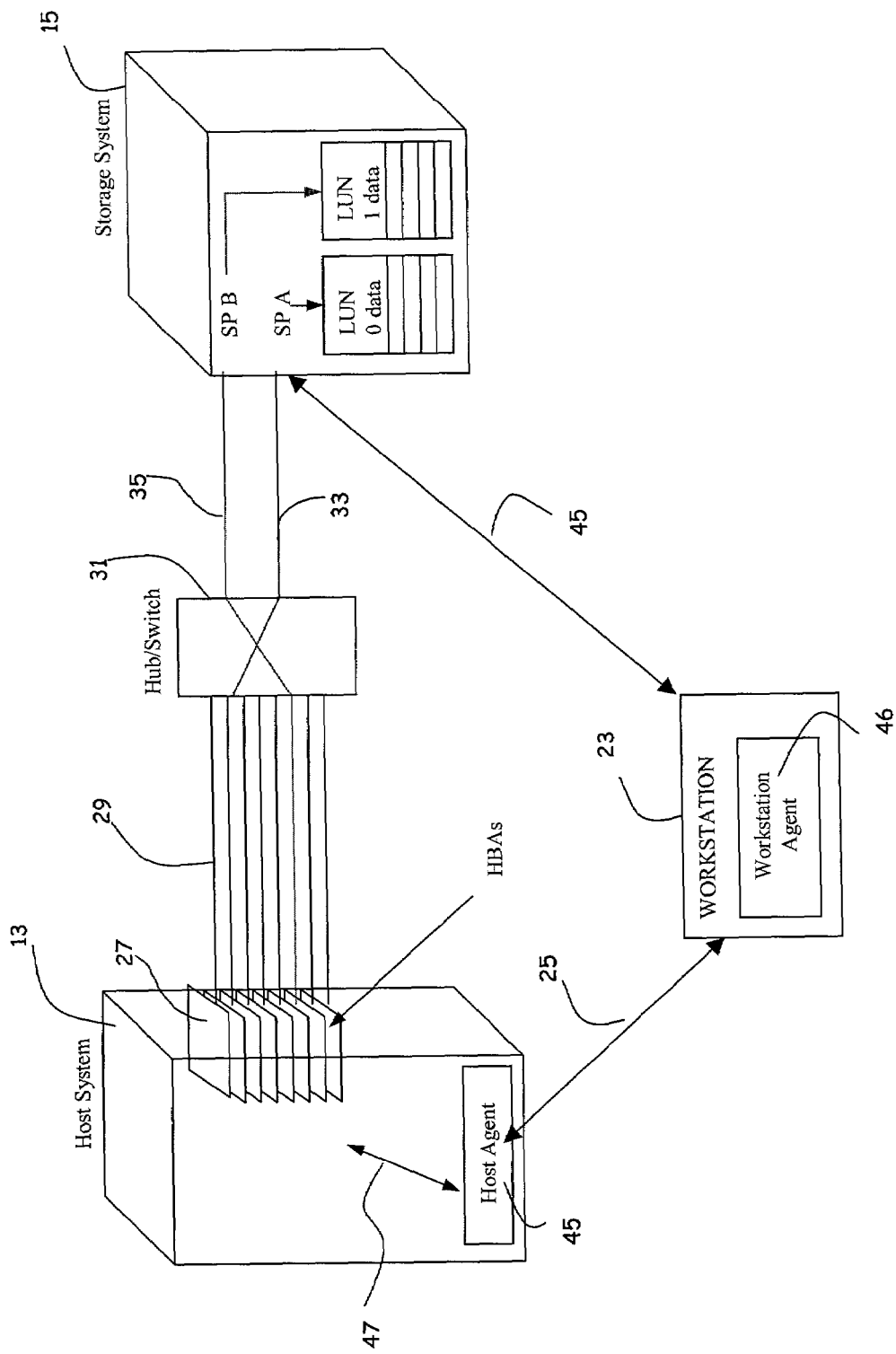
FIG. 3 is a schematic block diagram illustrating in greater detail a connection between a host system and a target device in a system as that of FIG. 2, and showing a connection from the host system to a workstation, with a direct connection from the workstation to the target device.
Figure 4:
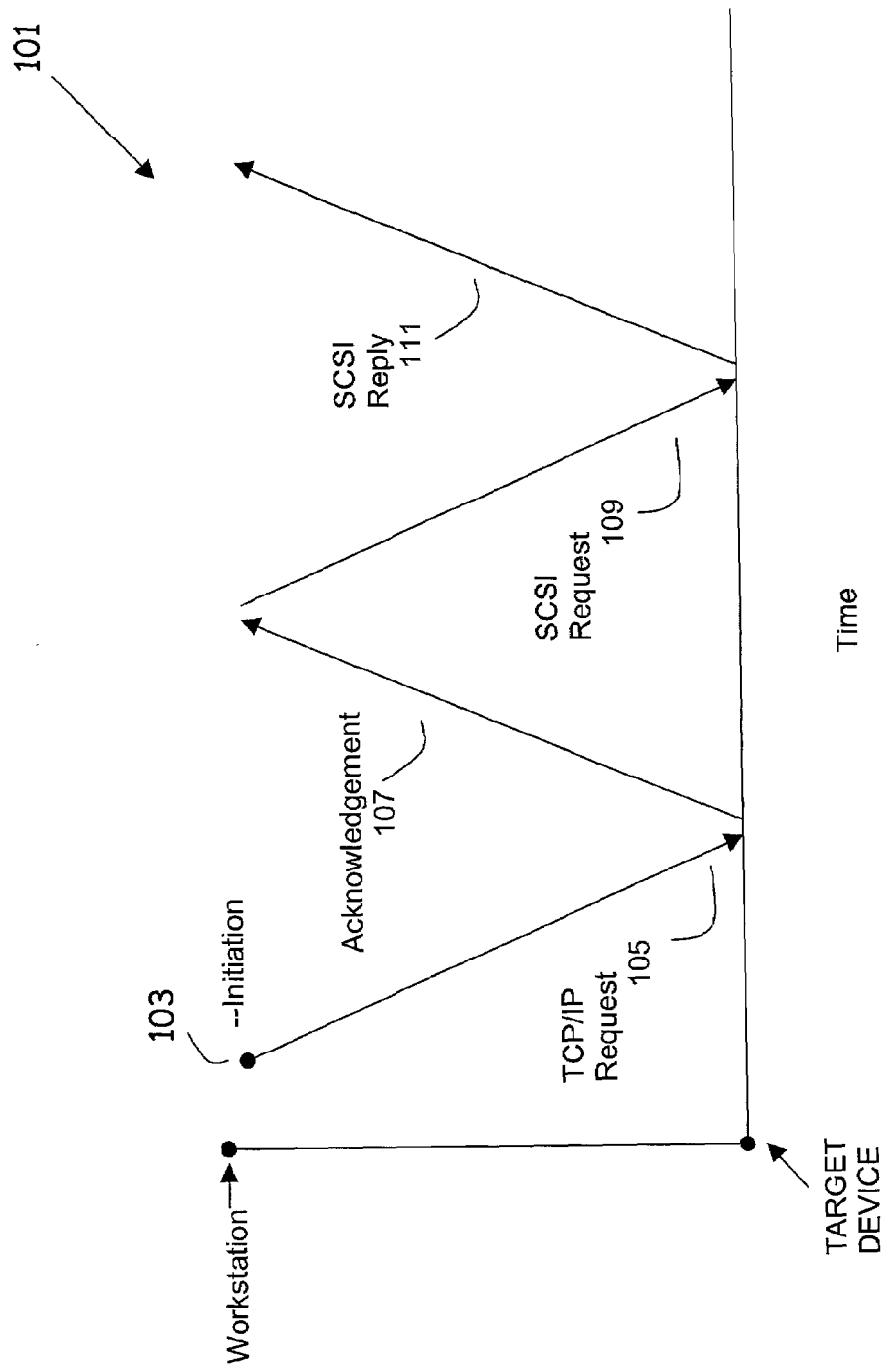
FIG. 4 is a time line graph illustrating how a communication in accordance with the system and method described herein is initiated by a workstation, and showing the exchange of messages between the workstation and the target device occurs.

The details of how such SCSI requests are transmitted over TCP/IP are discussed hereafter with reference to a more complex computer system disclosed in FIGS. 2 and 3, as well as with respect to the specific protocol provided in greater detail hereafter and illustrated by the graph of FIG. 4. More particularly, as will be evident from the detailed discussion, the SCSI requests are encapsulated over a TCP/IP to allow the computer system 7 to communicate directly with the storage system 9. The software enabling the functionality is resident in the computer system 7, and in the storage system 9. Generally speaking, the computer system 7 constructs a SCSI request to send out on a TCP/IP connection. Thus, there is disclosed herein a way of carrying the SCSI protocol on top of TCP/IP.

FIG. 2 illustrates a typical system 11 in which the method and system described herein are implemented. A host system 13, is typically a server such as a Sun™ server, available from Sun Microsystems, Inc., running an operating system such as Linux™, Unix™, or Windows NT™, available respectively from Red Hat Software, Inc., AT&T, Inc., and Microsoft Corporation. The host system 13 is connected, depending on throughput required, through various SCSI fibre cables 17, 19 and 21 to multiple target devices 15, which can be storage systems such as those commercially available from EMC Corporation under the trademark Clariion. Fibre Channel or other type cable connections are shown with different numbers of lines for purposes of illustrating various levels of robustness required of the cable for purposes of communication and input/output (I/O) requests occurring between the host system 13 and the target systems 15. The host system 13 also is connected through a communications line 25, which can take many forms, as will be readily apparent to those of ordinary skill, to a workstation 23. The workstation 23 includes software therein for operating the host system and controlling the various I/O operations occurring between the host system 13 and the various target devices 15. In addition, the workstation is directly connected by means of a network 47 to support TCP/IP communication through a connector such as an Ethernet™ connector, available from Xerox Corporation, directly at connections 45 to each of the individual target devices 15.

FIG. 3 illustrates in greater detail a typical connection between a host system 13, target device 15 and workstation 23. The host system 13, as noted previously, is typically a server including multiple host bus adapters 27 which include a cable connector which connects to, e.g., Fibre Channel 29 providing multiple paths to a target device 15. The cable 29 is connected through a hub/switch 31 and through respective connections 33 and 35 to storage processor A and storage processor B, which serve to control the operation of the storage system 15, including the LUN 0 data and LUN 1 data, and controlling the various I/O requests from the host system 13. For purposes of this disclosure, the host bus adapters 27 are specifically identified by the designation HBAs in the Figure, which is a term well known to those of ordinary skill in the art, and the nature and structure of these devices is also well known.-

The workstation 23 is connected directly through a communications line 25 to the host system 13 having a host agent 45 resident therein to allow the host system 13 to execute I/O and other types of commands. The host agent 45 is a software module which communicates as depicted by line 47 with the various components of the host system 13 to effect communications with the target system 15 through the host bus adapters 27 and the cable 29.

The workstation 23 also includes a workstation agent 46, also a software module, and is connected directly, for example, by means of TCP/IP connection 45 to the storage system 15. This connection allows direct communication between the workstation 23 and the storage system 15 without interrupting conventional SCSI I/O operations which are occurring between the host system 13 and the storage system 15.

In accordance with the system and method described herein, SCSI requests are encapsulated over TCP/IP to allow workstation 23 to communicate directly with the storage system 15. Software enabling this functionality is resident, as shown in FIG. 3, as the workstation agent 46, in part as the host agent 45, and throughout the system 11, including the storage system 15. The software, including the workstation agent 46, constructs a SCSI request to send out on a TCP/IP connection. Thus, the method and system provide a way of carrying the SCSI protocol on top of TCP/IP.

In accordance with the system and method described herein, a list of IP addresses are configured as part of the management of the storage system 15. The addresses for the workstations 23, storage systems 15, and host system 13, if using the TCP/IP connection, are specified in advance and stored in the storage system 15.

In order to pass the SCSI request over TCP/IP, the SCSI requests are encoded using CTLD.

It is noted that the acronym "CTLD" stands for Control, Tag (or type), Length and Data. CTLD encoding provides framing that defines message boundaries in the TCP/IP data stream. All messages are prefixed with a CTLD header that defined the message type and length. The CTLD header has the following format:

TABLE 1

TLD Data Block Format

| Component | Bytes | Notes |
| --- | --- | --- |
| Control | 1 | See Section below on Structure of the Control Byte |
| Tag | Variable | Max 4 bytes in binary mode |
| Length | Variable | Max 8 bytes in binary mode |
| Data | Variable | See Embedded TLD data blocks in next section. |

Embedded Tag and Length and Data (TLD) Blocks can be embedded in other Tag, Length and Data Blocks. The data component is simply a stream of bytes. Because of this, the protocol supports 1 or more separate TLD data blocks to be embedded within the data component of another TLD data block. This allows a hierarchical structure of TLD data blocks with lower level data blocks being contained by higher-level data blocks. The table below depicts this feature of the TLD protocol. There are two rows in the table below. The first row shows the top level only, and the second row shows the details of the embedded TLD data blocks and also shows what this data would look like in a stream.

TABLE 2

Embedded TLD Data Blocks

| Level 1 | C[1] | T | L | Data Component of TLD data Block | | | | C | T | L | D |
| --- | --- | --- | --- | --- | --- | --- | --- | --- | --- | --- | --- |
| Stream | C | T | L | C | T | L | D | C | T | L | D | C | T | L | D |

[1]The embedded bit of this control byte would be set to 1.

Structure of the Control Byte.

TABLE 3

Binary Mode Control Byte

| Bits in Byte: | 7 | 6 | 5 | 4 3 2 | 1 | 0 |
| --- | --- | --- | --- | --- | --- | --- |
| Meaning: | Tag length in bytes[1] | Embedded Flag[2] | Bytes in Length[1] | reserved | Mode (0) |

[1]The lengths of the tag and length fields are specified in bytes, and the actual lengths are 1 more than specified. Thus a tag length of 0 translates into a tag length of 1 byte. The tag will always take at least 1 byte, and the length needs one byte even to specify zero data length. Thus the smallest TLD block will be 3 bytes long.
[2]The embedded flag indicates whether the data component is actually more TLD data blocks. If this bit is set it indicates that the data component contains embedded TLD data blocks.

Binary Mode Notes. The mode bit is off for binary mode. Both the Tag and Length are encoded as big endian (MSB on left) regardless of source. Lengths specified in the control byte are all in bytes. Maximum tag length is 4 bytes. Binary value extracted for the tag length is 1 less than the actual length. Maximum length of the data length field is 8 bytes. Binary value extracted for the length of the length field is 1 less than the actual length. All fields are sent with the most significant byte first.

In accordance with the system and method described herein, SCSI requests are encoded with tags. The fields are structured substantially the same as requests to be transmitted over the cable 29, and include a request ID to allow the workstation 23 and workstation agent 46, to match replies with requests. Data buffers transferred to the workstation agent 46 are returned independent of the status of the request that generated the data.

The data buffers are established in network byte order as they would be constructed for the conventional SCSI cable interface. Request IDs are typically four bytes long, but can be other lengths.

The following discussion illustrates how messages are exchanged between the workstation 46 and a target device such as storage system 15.

(1) Messages
(a) SCSI Request
This message sends a SCSI request from the workstation agent 46 to target device 15.

Tag = TAG_NET_SCSI_REQUEST
Sub Tag = TAG_NET_REQUEST_ID
Sub Tag = TAG_NET_SCSI_CMND_PAYLOAD
Sub Tag = TAG_NET_BUFFER

The TAG_NET_REQUEST_ID is uninterpreted by target device 15 and will be returned in the reply message.

The TAG_NET_SCSI_CMND_PAYLOAD contains a fiber control protocol (FCP) command (CMND) Payload as described in the readily commercially available SCSI Fibre Specification, as is well known to those of ordinary skill in the art.

The TAG_NET_BUFFER is a conditional Sub Tag; if target device 15 will read the data buffer from the workstation agent 46 for the command description block (CDB) this provides that data. If target device 15 will return a data buffer to the workstation agent 46, this Sub Tag should not be present.

(b) SCSI Reply
This message returns the status of a SCSI request from target device 15 to the workstation agent 46.

Tag = TAG_NET_SCSI_REPLY
Sub Tag = TAG_NET_REQUEST_ID
Sub Tag = TAG_NET_SCSI_RSP_PAYLOAD

The TAG_NET REQUEST_ID returns the Request ID of the request.

(c) SCSI Buffer
This message returns the data generated by target device 15 when processing a SCSI request. It may proceed or follow the SCSI status for the request.

Tag = TAG_NET_SCSI_RESULT_BUFFER
Sub Tag = TAG_NET_REQUEST_ID
Sub Tag = TAG_NET_SCSI_BUFFER

The TAG_NET_REQUEST_ID returns the Request ID of the request that generated this reply buffer.

The TAG_NET_SCSI_BUFFER returns the data buffer generated by target device 15.

(d) Option Request
This message sends a TCP specific request from the workstation agent 46 to target device 15. At this time there are no options defined. The CTLD encoding of SCSI requests contains features to allow it to be extended in the future should the need for other features or different behavior become apparent. For example it may be desirable to support network specific behavior such as having target device 15 generate alerts for some conditions. All the sub-tags other than the request ID tag of this will be ignored in this version of this interface, but may be used in the future.

Tag = TAG_NET_OPTION_REQUEST
Sub Tag = TAG_NET_REQUEST_ID

The TAG_NET_REQUEST_ID specifies a Request ID tag that target device 15 will return with the reply.

This option request can be sent at any time. An appropriate tag will be defined with the new interface. Other tags maybe added in the future as options are defined.

(e) Option Reply
This message returns the result of an Option Request from target device 15 to the workstation agent 46. At this time the response will always be unsupported request. At some time in the future this request may be defined and the reply will return a status of zero to indicate successful request.

Tag = TAG_NET_OPTION_REPLY
Sub Tag = TAG_NET_REQUEST_ID
Sub Tag = TAG_NET_OPTION_STATUS

The TAG_NET_REQUEST_ID returns the ID of the request that generated this reply.

The TAG_NET_OPTIONS_STATUS returns a value of 1 indicating the request is not supported.

This message will also be sent by target device 15 to inform the workstation agent 46 of problems with the connection, the target device 15 receives a connection and finds it can not service the connection, the target device 15 will send an Option Reply message with a status indicating why it will not service the connection. Thus, if the workstation agent 46 were to send an Option Request as the first request to target device 15, a reply with a failure status will indicate why the connection is being closed.

The following values are defined for the status:
0 Request accepted
1 Request not supported (or tag in request not supported)
2 Connection not accepted, authorization failure
3 Connection not accepted, too many connections (2) Connection Management
At the target devices 15, in order to manage the number of connections, the target device 15 will listen for TCP connections on a specific port. Generally, the target device 15 will accept all connections, but if it already has more than a predetermined maximum, for example, at least 8, it sends a TAG_NET_OPTION_REPLY having a status value of 3, which indicates that the maximum number of connections has been exceeded and the connection is closed. If a connection is not accepted because the workstation agent 46 IP address is not in the list of allowed hosts, a status value of 2 is indicated, communicating to the workstation 23 that there is an authorization failure. When reading connections, the storage system 15 will implement a timeout and if it ever takes more than a predetermined amount of time to finish reading a complete message, the connection is closed. The timeout does not start until the first byte of the message has been received.

FIG. 4 illustrates in a simpler graphical form over time, a typical exchange 101 between a workstation 23 and a target device 15. At an initial time, the workstation initiates 103 a request. The request is initiated and transmitted as a TCP/IP request 105 to the target device 15. If the request is acceptable, an acknowledgement 107 is transmitted from the target device 15 to the workstation 23. The workstation 23 then transmits the SCSI request 109 to the target device 15. The target device 15 transmits a SCSI reply 111 to the workstation 23.

It is important to appreciate from the foregoing that the data buffer is sent in conjunction with the SCSI request in a manner substantially different from direct SCSI requests from a host system to a target device. This allows the host system to supply the data buffer without an explicit request from the target system. Thus, the target system is allowed to receive the data immediately following the request without having to make an explicit request to obtain the data buffer.

By the term "in conjunction" is generally meant "at the same time", indicating that the transmission sends the SCSI request serially before the buffer. More specifically, the initiator host can transmit both the request and the buffer without any interaction or coordination with the target host. This is different from standard SCSI which does require an interaction. This change to SCSI can be made when using SCSI on TCP/IP because TCP/IP provides flow control that allows the target system to limit the data received from the initiator system. Without TCP/IP flow control (standard SCSI), the target system must request the data transfer to allow the target to manage internal buffer space.

In accordance with the system and method herein, it is recognized that having TCP/IP flow control allows discontinuing one particular aspect of SCSI. Doing this will save a message round trip and that will allow initiators to write data to targets using TCP/IP faster with the method and system than will be otherwise possible.

Having thus described the invention in detail, the same will become better understood from the appended claims in which it is set forth in a non-limiting manner.

The invention claimed is:

1. A method of transmitting requests to a target device, comprising:
   (a) establishing network connections through a SCSI cable between a server and a target device, and a connection between the server and a workstation;
   (b) establishing a direct TCP/IP connection between the workstation making up part a computer system and a target device on a network without involving the server;
   (c) encoding a SCSI request with a tag identifying the request as a SCSI request, and structuring the request with a request IP/ID at the workstation;
   (d) sending the tagged SCSI request to the target device directly from the workstation through the TCP/IP connection without involving the server;
   (e) returning the request IP/ID of the SCSI request from the target device directly to the workstation of the computer system through the TCP/IP connection without involving the server.

2. The method of claim 1, wherein said encoding step (b) further comprises structuring and encoding the field of the SCSI request which is direct from the workstation over the TCP/IP connection between the workstation and the target device in a manner substantially the same as a direct SCSI request over the SCSI cable between the server making up a host system of the computer system, to a target device, with said structuring and encoding being done using CTLD wherein the SCSI request is prefixed with a CTLD header that defines the request type and length.

3. The method of claim 2, wherein said encoding step (b) further comprises including a data buffer containing data to allow the target device to read the data buffer using the established TCP/IP connection.

4. The method of claim 2, wherein said step (d) further comprises returning a data buffer generated by the target device to the workstation using the established TCP/IP connection.

5. The method of claim 2, wherein said target device is a storage system.

6. The method of claim 5 wherein said computer system comprises a server connected to the storage system through SCSI cable, a workstation connected to the server, and further comprising the workstation directly connected to the storage system for establishing the TCP/IP connection with the storage system.

7. The method of claim 1, wherein said transmission step (c) further comprises sending the data buffer in conjunction with the SCSI request in a manner substantially different from direct SCSI requests from a host system to a target device, and which allows the host system to supply the data buffer without an explicit request from the target system, whereby the target system is allowed to receive the data immediately following the request without having to make an explicit request to obtain the data buffer.

8. The method of claim 1, wherein said target device is a storage system.

9. The method of claim 1, further comprising denying a connection from the workstation to the target device if a request from the workstation does not include a recognized IP/ID.

10. The method of claim 1, further comprising denying a connection from the computer system to the target device if the time for reading a completed message exceeds a predetermined amount of time.

11. The method of claim 1, wherein said direct connection is established on a network separate from a SCSI cable connection between the host system and the target device.

12. The method of claim 1, wherein said computer system comprises a host and a workstation connected directly thereto, each containing software for cooperation with each other and further comprising operating said software to construct SCSI requests to send over a direct TCP/IP connection between the workstation and target device.

13. A system for directly transmitting requests to a target device connected to a computer system, comprising:
   (a) a computer system including a server connected to a target device through a SCSI cable and connected to a workstation;
   (b) the workstation also being connected directly through a direct TCP/IP connection to a target device without involving the server;
   (c) the computer system being configured for encoding a SCSI request with a tag identifying the request as a SCSI request, and for structuring the request with an IP/ID directly from the workstation to the target device through the TCP/IP connection without involving the server;
   (d) an instruction module in the computer system and in the workstation for sending the tagged SCSI request to a target device directly from the workstation through the TCP/IP connection to the target device when a host server of the computer system is also connected through the SCSI cable to the target device without involving the server; and (e) the target device being programmed to accept the SCSI request and for returning the request IP/ID of the SCSI request and a reply directly to the workstation of the computer system, when connected thereto, through the TCP/IP connection without involving the server.

14. The system of claim 13, wherein the computer system is further configured for structuring and encoding the field of the SCSI request which is direct from the workstation over the TCP/IP connection between the workstation and the target device in a manner substantially the same as a direct SCSI request over the SCSI cable between the server making up a host system of the computer system through a target device and for said structuring and encoding being done using CTLD wherein the SCSI request is prefixed with a CTLD header the request type and length.

15. The system of claim 14, wherein the computer system is further configured for, as part of the encoding, creating a buffer containing data to allow the target device to read the data buffer.

16. The system of claim 14, wherein the target device is configured for generating and returning a data buffer to the computer system in response to a request received from the computer system.

17. The system of claim 14, wherein said target device is a storage system.

18. The system of claim 17, wherein said computer system comprises a server connected to the storage system through SCSI cable, a workstation connected to the server, and further comprising the workstation directly connected to the storage system for establishing a TCP/IP connection with the storage system.

19. The system of claim 13, wherein said target device is a storage system.

20. The system of claim 13, wherein the target device is configured for denying a connection from the workstation thereto if a request from the workstation does not include a recognized IP/ID.

21. The system of claim 13, wherein the target device is configured for denying a connection from the workstation to the target device if the time for reading a completed message exceeds a predetermined amount of time.

22. The system of claim 13, further comprising a network for establishing the TCP/IP connection between the host system and target device.

23. The system of claim 13, wherein the target device is configured for denying a connection from the workstation to the target device if the time for reading a completed message exceeds a predetermined amount of time.

24. The system of claim 13, further comprising a network for establishing the TCP/IP connection between the host system and target device.

25. The system of claim 13, wherein said computer system comprises a host and a workstation connected directly thereto, each containing software for cooperation with each other and further comprising operating said software to construct SCSI requests to send over a direct TCP/IP connection between the workstation and target device.

* * * * *